United States Patent [19]

Irie et al.

[11] Patent Number: 4,458,103

[45] Date of Patent: Jul. 3, 1984

[54] INSULATING JOINT FOR RUBBER OR PLASTIC INSULATED POWER CABLE

[75] Inventors: Shin-ichi Irie; Yasuhiro, Yamashita, both of Ichihara; Takao, Nakano, Yokohama; Teruyoshi, Tanabe, Ichihara, all of Japan

[73] Assignee: The Furukawa Electric Co., Ltd., Tokyo, Japan

[21] Appl. No.: 472,940

[22] Filed: Mar. 7, 1983

[30] Foreign Application Priority Data

Mar. 10, 1982 [JP] Japan .................................. 57-36636

[51] Int. Cl.³ .................. H02G 15/08; H02G 15/188; H01B 1/24
[52] U.S. Cl. ..................................... 174/73 R; 174/85
[58] Field of Search .............. 174/73 R, 73 SC, 84 R, 174/85, 88 C

[56] References Cited

FOREIGN PATENT DOCUMENTS

| 22660 | 1/1981 | European Pat. Off. .......... 174/84 R |
| 26733 | 4/1981 | European Pat. Off. . |
| 2294568 | 7/1976 | France . |
| 2431784 | 2/1980 | France . |
| 55-117820 | 9/1980 | Japan ................................ 174/73 R |
| 1433129 | 4/1976 | United Kingdom ............. 174/73 R |
| 2038111 | 7/1980 | United Kingdom . |

Primary Examiner—Laramie E. Askin
Attorney, Agent, or Firm—Frishauf, Holtz, Goodman & Woodward

[57] ABSTRACT

In an insulating joint for a rubber or plastic insulated power cable, insulation shields are formed around insulation layers covering cable conductor joint portions of adjacent cables so that the insulation shields are longitudinally opposed to each other with a layer with high dielectric constant and high volume resistivity interposed therebetween. The layer comprises a mixture consisting of 100 parts by weight of a rubber or plastic as a base, 50 to 700 parts by weight of one or both of silicon carbide or zinc oxide, and 2 to 60 parts by weight of carbon black.

3 Claims, 2 Drawing Figures

INSULATING JOINT FOR RUBBER OR PLASTIC INSULATED POWER CABLE

BACKGROUND OF THE INVENTION

The present invention relates to a novel insulating joint with electrically separated part for rubber or plastic insulated power cables.

In the sheath of a single conductor cable, electromagnetic induction of a conductor current involves a potential which causes a sheath circuit loss. However, such a potential may be lowered by the so-called crossbond method. The crossbond method uses an insulating joint between adjacent cables. In the insulating joint, the insulation shield is electrically insulated by some means.

An example of the electrically separated part of the insulating joint for rubber or plastic insulated power cables is shown in FIG. 1. Referring to FIG. 1, insulation shields 5 are coaxially formed around two jointed conductors 1 and 1, thus defining an electrically separated part 8 which separates the insulation shields 5 in the vertical direction. Such an insulating joint of such a crosslinked polyethylene insulated cable is manufactured in the following manner.

In order to join the ends of two cables, cable insulations 3 are tapered as shown in FIG. 1. After the conductors 1 and 1 are spliced with a compression sleeve or the like, a conductor shield 2 of a semiconductive type or a semiconductive thermally-shrinkable tube is formed thereover. After winding a rubber or plastic insulating tape such as a crosslinkable insulating tape around the conductor shield 2, the resultant structure is heated under pressure for bonding. Alternatively, a joint insulation layer 4 is formed on the conductor shield 2 by placing a suitable mold (not shown) around the conductor shield 2, injecting or extruding a melted resin into the mold, and adhering them together by heating by a suitable means. Insulation shields 5 defining an electrically separated part 8 therebetween are coaxially formed around the joint insulation layer 4, thus completing manufacture of a joint.

However, a conventional insulating joint of this type for a rubber or plastic insulated cables has many drawbacks as listed below:

(1) When the layer of the wound tape is heated for adhesion, the distal ends of the insulation shields 5 defining the electrically separated part 8 therebetween are deformed. Since the electric field acting on these distal ends therefore increases, the resultant joint will easily break down at these distal ends.

(2) When the electrically separated part 8 is defined by the insulation shields 5, it is hard to form the insulation shields 5 coaxially and concentrically. Therefore, disturbance in the electric field easily occurs.

In order to eliminate these drawbacks, it is proposed, as shown in FIG. 2, to form a layer 7 with high dielectric constant and high volume resistivity on a joint insulation layer 4 which covers the joint portion of conductors of rubber or plastic insulated cables. The layer 7 has a volume resistivity, at an AC voltage of commercial frequency, of $10^6$ to $10^{12}$ $\Omega$·cm and a specific dielectric constant of 6 to 100. The layer 7 thus defines an insulating joint of high dielectric constant and high volume resistivity type which electrically separates insulation shields 6. If the volume resistivity of layer 7 is below $10^6$ $\Omega$·cm and the specific dielectric constant of the layer 7 exceeds 100, respectively, flashover occurs due to an impulse voltage which may enter the cable. On the other hand, if the volume resistivity of layer 7 exceeds $10^{12}$ $\Omega$·cm and the specific dielectric constant of the layer 7 is below 6, respectively, electrical stress concentration occurs upon application of a load on the cable, easily leading to breakdown.

In a conventional electrically separated part of high dielectric constant and high volume resistivity type, method is proposed in which a layer of high volume resistivity within the range as defined above is formed around an insulator by suitably adjusting the carbon content. According to this method, the layer with high volume resistivity containing only carbon causes variations in volume resistivity upon being subjected to a thermal history such as a heat cycle based on a cyclic loading.

SUMMARY OF THE INVENTION

It is an object of the present invention to provide a stable and simple insulating joint of high dielectric constant and high volume resistivity type, which is free from the above-mentioned drawbacks.

DETAILED DESCRIPTION OF THE PREFERRED EMBODIMENTS

Figure 1:
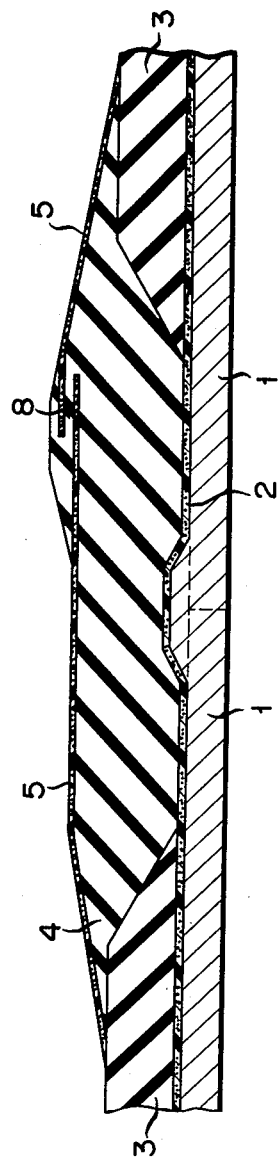
FIG. 1 is a partial longitudinal sectional view showing a conventional insulating joint for a rubber or plastic insulated cable.
Figure 2:
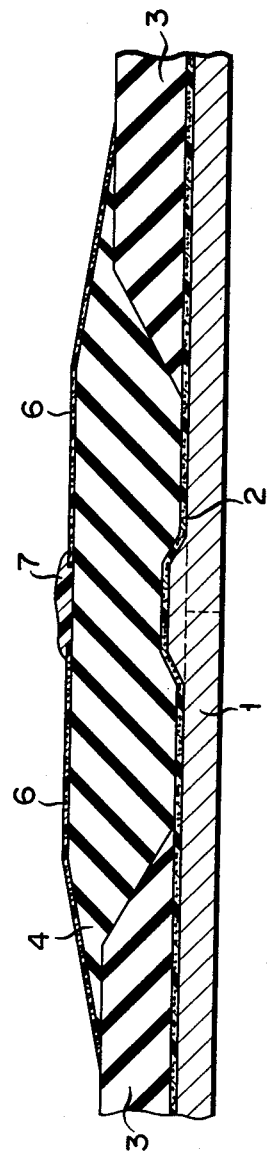
FIG. 2 is a partial longitudinal sectional view showing an insulating joint according to an embodiment of the present invention.

The insulating joint of the present invention has a layer 7 of high dielectric constant and high volume resistivity as shown in FIG. 2. The layer 7 comprises a composition consisting of 100 parts by weight of a base resin such as a rubber or plastic, 50 to 700 parts by weight of silicon carbide or zinc oxide, and 2 to 60 parts by weight of carbon. The rubber-type base resin may be ethylene-propylene rubber, ethylene-vinyl acetate rubber, acrylic rubber, fluororubber, styrene-butadiene rubber, butadiene rubber, or the like. The plastic-type base resin may be low-, medium- or high-density polyethylene; an ethylene-propylene copolymer; an ethylene-propylene-diene monomer terpolymer (EPDM); an ethylene-ethyl acrylate copolymer; an ethylene-vinyl acetate copolymer; an ethylene-α-olefin-polyene terpolymer (e.g., elastomer: ethylene-1-butene-5-ethylidene-2-norbornene terpolymer manufactured by Mitsubishi Petrochemical Co., Ltd.); mixtures thereof; and crosslinked materials thereof.

The mixing ratio of the composition for the layer 7 of the present invention is determined as described above for the following reasons. When the amount of silicon carbide or zinc oxide is less than 50 parts by weight based on 100 parts by weight of the base resin, the volume resistivity will fluctuate when the cable is subjected to a thermal history. On the other hand, when the amount of silicon carbide or zinc oxide exceeds 700 parts by weight, the resultant composition becomes too hard and does not allow easy processing. When the amount of carbon is less than 2 parts by weight, desired dielectric constant and volume resistivity are not obtained. On the other hand, when the amount of carbon exceeds 60 parts by weight, the resultant composition becomes too hard and does not allow easy processing.

The cable of the present invention contains silicon carbide or zinc oxide in the layer 7. Therefore, as compared with a layer with high dielectric constant and high volume resistivity containing only carbon, changing of a carbon black structure hardly occurs and the volume resistivity hardly changes when the cable is subjected to a thermal history based on a cyclic loading. The insulation layer 4 may be a member selected from the group consisting of low-, medium- and high-density polyethylene; and ethylene-propylene copolymer; an ethylene-propylene-diene monomer terpolymer; an ethylene-α-olefin-polyene terpolymer; an ethylene-ethyl acrylate copolymer; an ethylene-vinyl acetate copolymer; mixtures thereof; and crosslinked materials thereof.

The electrically separated part is formed in the following manner according to the present invention.

(1) A tape of the above-mentioned composition is wound around the joint insulation layer 4. The layer of the wound tape is heated to be adhered to the joint insulation layer 4 as needed.

(2) A tube (for instance a heat shrinkable tube) of the above-mentioned composition is prepared in advance to have a diameter corresponding to the outer diameter of the joint insulation layer 4. After the joint insulation layer 4 is formed, it is covered with the tube and heated for firm adhesion.

(3) After forming the joint insulation layer 4, a mold is placed therearound. The above-mentioned composition is injected or extruded into the mold in accordance with the design of the electrically separated part. The molded layer is heated for good adhesion.

The thickness and width of the layer with high dielectric constant and high volume resistivity may vary according to the rated voltage of the cable. In the case of a cable having a rated voltage of 66 kV, for example a thickness of 1 to 3 mm for the layer and a separating distance of 50 to 100 mm between the insulation shields at the electrically separated part are preferable.

EXAMPLE 1

After the ends of two 154 kV, 600 mm² crosslinked polyethylene insulated cables were tapered, the conductors 1 were connected with a compression sleeve (not shown). A semiconductive tape (a tape consisting of DFDJ 0580 manufactured by Nippon Unicar Co., Ltd.) was wound around the conductor joint and was heated at 150° C. for 4 hours to form a conductor shield 2. A mold (not shown) was placed around the conductor shield and the tapered cable insulation 3, and a polyethylene composition containing a crosslinking agent (HFDJ 4201 manufactured by Nippon Unicar Co., Ltd.) was extruded into the mold from an extruder having a 30 mm screw diameter so as to form a joint insulation layer 4. The extruder (not shown) was set at a temperature of 120° C. After cooling, the mold was removed. A tape of the composition shown in Table 1 below was wound 3 mm thick over 100 mm separating distance to form a layer 7 with high dielectric constant and high volume resistivity shown in FIG. 2, while the semiconductive tape described above was wound on other portions of the joint to form insulation shields 6. The joint was placed in a vulcanizing tube (not shown) and heated in a nitrogen gas atmosphere at 210° C. and 8 kg/cm² for 6 hours. The joint was then cooled under a gas pressure. The thickness of the joint insulation layer 4 was 25 mm.

After the joint was made in this manner, each sample was given an impulse flashover test and checked for the volume resistivity of the layer with high dielectric constant and high volume resistivity by application of an AC voltage of commercial frequency. A load current was applied to the conductors of each sample for 200 days approximately 8 consecutive hours each day. The load current produced a conductor temperature of 90° C. After performing this heat cycle test, each sample was subjected again to the impulse flashover test and checking of the volume resistivity of the layer with high dielectric constant and high volume resistivity by application of an AC voltage of commercial frequency. The results obtained are also shown in Table 1 below.

TABLE 1

| | | Sample 1 | Sample 2 | Sample 3 | Sample 4 | Sample 5 | Comparative Example 1 |
|---|---|---|---|---|---|---|---|
| Composition of layer with high dielectric constant and high volume resistivity (parts by weight) | Ethylene-propylene-ethylidene *1 norbornene copolymer | 100 | 100 | 100 | 100 | 100 | 100 |
| | Silicon carbide *2 | 100 | 700 | 100 | 700 | 50 | |
| | Carbon black *3 | 30 | 50 | 50 | 50 | 40 | 25 |
| | Dicumyl peroxide | | | 2.0 | 2.0 | | 2.0 |
| | 4,4'-thiobis-(6-tert-butyl-3-methylphenol) | | | 0.3 | 0.3 | | 0.3 |
| Characteristics of electrically separated part after manufacture | Volume resistivity upon application of AC voltage of 50 Hz (Ω·cm) | $3 \times 10^9$ | $2 \times 10^8$ | $8 \times 10^7$ | $3 \times 10^8$ | $9 \times 10^6$ | $3 \times 10^7$ |
| | Impulse breakdown voltage (kV) | 130 | 110 | 100 | 110 | 90 | 80 |
| Characteristics of electrically separated part after heat cycle test | Volume resistivity upon application of AC voltage of 50 Hz (Ω·cm) | $3 \times 10^9$ | $3 \times 10^8$ | $2 \times 10^8$ | $1 \times 10^8$ | $1 \times 10^7$ | $3 \times 10^5$ |
| | Impulse breakdown voltage (kV) | 130 | 110 | 100 | 110 | 90 | 20 |

*1: JSR EP51; manufactured by JAPAN SYNTHETIC RUBBER CO., LTD.
*2: GC-2000; manufactured by SHOWA DENKO K.K.
*3: Vulcan XC-72; manufactured by Columbia Carbon Corp.

The insulating joints of Samples 1 to 5 of Example 1 of the present invention had stabler characteristics of the electric insulator after heat cycle thermal history than that of Comparative Example 1.

EXAMPLE 2

After the ends of two 66 kV, 250 mm² crosslinked polyethylene insulated cable were tapered, conductors 1 were connected with a compression sleeve (not shown). A semiconductive tape (a tape consisting of DFDJ 0580 manufactured by Nippon Unicar Co., Ltd.) was wound around the conductor joint, and heated at 150° C. for 3 hours to form a conductor shield 2. Thereafter, a mold (not shown) was placed around the conductor shield and the tapered cable insulation 3, and a crosslinkable polyethylene composition (HFDJ 4201 manufactured by Nippon Unicar Co., Ltd.) was extruded into the mold to a thickness of 12 mm from an extruder having a screw diameter of 30 mm, thus forming a joint insulation layer 4. The extruder was set at a temperature of 120° C. After the extruded layer was cooled, the mold was removed. A tape of the composition of each sample as shown in Table 2 below was wound 2 mm thick over a separating distance of 70 mm so as to form a layer 7 with high dielectric constant and high volume resistivity. The semiconductive tape described above was wound to form insulation shields 6. The joint was placed in a vulcanizing tube (not shown) and heated in a 8 kg/cm² nitrogen gas atmosphere at 210° C. for 4 hours. The joint was cooled thereafter under a gas pressure.

Each joint thus obtained was subjected to the impulse flashover test and checking of the volume resistivity of the layer 7 by application of an AC voltage of 50 Hz. Thereafter, a load current was applied to the conductors for 200 days approximately 8 consecutive hours each day. The load current produced a conductor temperature of 90° C. After the heat cycle test, each joint was subjected again to the same impulse flashover test and checking of the volume resistivity of the layer 7 by application of an AC voltage of 50 Hz. The results obtained are shown in Table 2 below.

TABLE 2

| | | Sample 1 | Sample 2 | Sample 3 | Sample 4 | Sample 5 | Sample 6 | Sample 7 | Comparative Example 2 |
|---|---|---|---|---|---|---|---|---|---|
| Composition of layer with high dielectric constant and high volume resistivity (parts by weight) | Ethylene-propylene-ethylidene *1 norbornene copolymer | 100 | 50 | | | | 100 | | 100 |
| | Butadiene *2 rubber | | | 100 | | | | | |
| | Ethylene-vinyl *3 acetate copolymer | | | | 100 | | | 100 | |
| | Low-density *4 polyethylene | | 50 | | | 100 | | | |
| | Silicon carbide *5 | 400 | 400 | 200 | 200 | 200 | | | |
| | Zinc oxide *6 | | | | | | 400 | 200 | |
| | Carbon black *7 | 5 | 5 | 17 | 7 | 7 | 5 | 7 | 15 |
| | Dicumyl peroxide | 2.0 | | | | | 2.0 | | |
| | 4,4'-thiobis-(6-tert-butyl-3-methylphenol) | 0.3 | | | | | 0.3 | | |
| Characteristics of electrical separator after manufacture | Volume resistivity upon application of AC voltage of 50 Hz ($\Omega \cdot$ cm) | $2 \times 10^9$ | $2 \times 10^7$ | $4 \times 10^8$ | $1 \times 10^7$ | $6 \times 10^6$ | $2 \times 10^{11}$ | $4 \times 10^{10}$ | $3 \times 10^7$ |
| | Impulse breakdown voltage (kV) | 140 | 120 | 100 | 100 | 90 | 160 | 160 | 70 |
| Characteristics of electrical separator after heat cycle test | volume resistivity upon application of AC voltage of 50 Hz ($\Omega \cdot$ cm) | $1 \times 10^9$ | $4 \times 10^7$ | $5 \times 10^8$ | $1 \times 10^7$ | $9 \times 10^6$ | $9 \times 10^{10}$ | $8 \times 10^9$ | $6 \times 10^4$ |
| | Impulse breakdown voltage (kV) | 140 | 120 | 100 | 100 | 90 | 160 | 160 | 10 |

*1: JSR EP51; manufactured by JAPAN SYNTHETIC RUBBER CO., LTD.
*2: Hiker-OR; manufactured by Goodrich, B.F. Chemical Co.
*3: EVA10K; manufactured by Mitsubishi Petrochemical Co., Ltd.
*4: NUC-9025; manufactured by Nippon Unicar Co., Ltd.
*5: GC-2000; manufactured by SHOWA DENKO K.K.
*6: Product of Sakai Chemical Industry Co., Ltd.
*7: ketjen black EC; manufactured by Akzo NV.

The joints of the respective samples of this Example had stabler characteristics of the electrically separated part than that of the Comparative Example 2 after being subjected to a thermal history, based on cyclic loading.

EXAMPLE 3

After the ends of two 66 kV, 250 mm² ethylene-propylene insulated cables were tapered, the conductors 1 were connected together with a compression sleeve (not shown). A semiconductive tape (a tape consisting of DFDJ 0580 manufactured by Nippon Unicar Co., Ltd.) was wound around the conductor joint and heated at 150° C. for 3 hours to form a conductor shield 2. An ethylene-propylene copolymer tape (Nordel 2722 manufactured by Du Pont de Nemours) was wound on the conductor shield and the tapered cable insulation 3, in thickness of 20 mm. In order to form a layer 7 with high dielectric constant and high volume resisitivity as shown in FIG. 2 on the joint insulation layer 4, a tape of the composition of Sample 1 in Table 2 was wound 2 mm thick over a separating distance of 70 mm. The semiconductive tape described above was also wound to form insulation shields 6. The joint was then placed in a vulcanizing tube (not shown), heated in a 8 kg/cm² nitrogen atmosphere at 210° C. for 4 hours and cooled under a gas pressure for completion.

The layer 7 of the completed joint had a volume resistivity of $2 \times 10^9$ Ω·cm at an AC voltage of 50 Hz and an impulse breakdown voltage of 140 kV.

The joint, after 200 cycles of 8 hour energization for 90° C. conductor temperature and 16 hour deenergization, was subjected to the same tests for checking the volume resistivity and impulse breakdown voltage. However, there was no significant change in the its characteristics.

EXAMPLE 4

After the ends of 154 kV, 600 mm² crosslinked polyethylene insulated cables were tapered, conductors 1 were connected with a compression sleeve. A semiconductive tape ("Conductive Tape C" manufactured by Furukawa Electric Co., Ltd.) was wound to a thickness of 2 mm to form a conductor shield 2. An insulating tape (F-CO 31 manufactured by Furukawa Electric Co., Ltd.) containing ethylene-propylene rubber as a base was wound around the conductor shield and the tapered cable insulation 3 to a thickness of 40 mm to form a joint insulation layer 4. A tape of the composition of Sample 1 of Table 1 above was wound around the insulation layer 4 to form a layer 7 with high dielectric constant and high volume resistivity shown in FIG. 2. The semiconductive tape described above was wound around the other portions of the insulation layer 4 to form insulation shields 6, thus completing the joint.

The layer 7 of the joint so made had a volume resistivity of $2 \times 10^9$ Ω·cm at an AC voltage of 50 Hz and an impulse breakdown voltage of 120 kV.

The joint was subjected for 200 days to a heat cycle of 8 hour energization for 90° C. conductor temperature and 16 hour deenergization each day. However, the joint underwent no changes in characteristics.

EXAMPLE 5

After the ends of 66 kV, 250 mm² polyethylene insulated cables (NUC 9025 manufactured by Nippon Unicar Co., Ltd.) were tapered, the conductors 1 were connected with a compression sleeve. A semiconductor tape (a tape of a compound consisting of 100 parts by weight of NUC 9025 and 70 parts by weight of Vulcan XC-72) was wound around the conductor joint, and was heated at 120° C. for 1 hour to form conductor shield 2. An insulating tape (a tape consisting of NUC 9025) was wound around the conductor shield and the tapered cable insulation 3 to a thickness of 12 mm to form a joint insulation layer 4. Subsequently, a tape of the composition of Sample 4 of Table 2 was wound to form a layer 7 with high dielectric constant and high volume resistivity as shown in FIG. 2. The joint obtained was heated in a 8 kg/cm² nitrogen atmosphere at 130° C. for 2 hours to complete preparation of the joint.

The layer 7 of the joint so made had an impulse breakdown voltage of 110 kV and a volume resistivity of $2 \times 10^7$ Ω·cm at an AC voltage of 50 Hz.

The joint was subjected to the same heat cycle test as in Example 1 above, but the characteristics of the joint remained unchanged.

What we claim is:

1. An insulating joint for joining two rubber or plastic insulated power cables which are adjacent each other longitudinally, said cables having conductors which are joined at a joint portion, said insulating joint having an insulation shield means around an insulation layer covering said cable conductor joint portion, the improvements wherein:

said insulation shield means of said cable joint comprises respective shield members longitudinally opposed to each other and having respective ends which are spaced from each other in the longitudinal direction of said cables; and a layer having a high dielectric constant and a high volume resistivity is interposed therebetween in said longitudinal space, said layer with high dielectric constant and high volume resistivity comprising a mixture consisting of 100 parts by weight of a rubber or plastic as a base, 50 to 700 parts by weight of one or both of silicon carbide or zinc oxide, and 2 to 60 parts by weight of carbon black.

2. An insulating joint according to claim 1, wherein the base of said layer with high dielectric constant and high volume resistivity is a member selected from the group consisting of low-, medium- and high-density polyethylene; an ethylene-propylene copolymer; an ethylene-propylene-diene monomer terpolymer; an ethylene-α-olefin-polyene terpolymer; an ethylene-ethyl acrylate copolymer; an ethylene-vinyl acetate copolymer; ethylene-propylene rubber; ethylene-vinyl acetate rubber; acrylic rubber; fluororubber; butadiene rubber; styrene-butadiene rubber; mixtures thereof; and crosslinked materials thereof.

3. An insulating joint according to claim 1, wherein said insulation layer comprises a member selected from the group consisting of low-, medium- and high-density polyethylene; an ethylene-propylene copolymer; an ethylene-propylene-diene monomer terpolymer; an ethylene-α-olefin-polyene terpolymer; an ethylene-ethyl acrylate copolymer; an ethylene-vinyl acetate copolymer; mixtures thereof; and crosslinked materials thereof.

* * * * *